(12) United States Patent
Whitmer (10) Patent No.: US 10,586,058 B2
(45) Date of Patent: *Mar. 10, 2020

(54) ENCRYPTED SEARCH INDEXES (71) Applicant: EMC IP Holding Company LLC, Hopkinton, MA (US)

(72) Inventor: Ray David Whitmer, Pleasant Grove, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,774

(22) Filed: Sep. 27, 2018

(65) Prior Publication Data

US 2019/0042767 A1 Feb. 7, 2019

Related U.S. Application Data (63) Continuation of application No. 14/980,676, filed on Dec. 28, 2015, now Pat. No. 10,127,391.

(51) Int. Cl.
*G06F 21/60* (2013.01)
*G06F 16/951* (2019.01)
*G06F 16/22* (2019.01)
*G06F 16/2455* (2019.01)
*G06F 21/62* (2013.01)

(52) U.S. Cl.
CPC ........ *G06F 21/602* (2013.01); *G06F 16/2228* (2019.01); *G06F 16/2272* (2019.01); *G06F 16/2455* (2019.01); *G06F 16/951* (2019.01); *G06F 21/6218* (2013.01)

(58) Field of Classification Search
CPC ............ G06F 17/30336; G06F 21/602; G06F 17/30477; G06F 17/30864; G06F 17/30321; G06F 12/1408
See application file for complete search history.

(56) References Cited

U.S. PATENT DOCUMENTS

| 7,587,368 | B2 * | 9/2009 | Felsher | G06F 19/328 |
| | | | | 705/65 |
| 7,873,601 | B1 | 1/2011 | Kushwah | |
| 8,442,994 | B1 * | 5/2013 | Chen | G06F 16/951 |
| | | | | 707/781 |
| 9,342,705 | B1 | 5/2016 | Schneider | |
| 9,454,673 | B1 * | 9/2016 | Sarukkai | G06F 21/6209 |
| 9,633,219 | B2 * | 4/2017 | Baessler | H04L 9/14 |
| 9,679,160 | B1 | 6/2017 | Zhang | |
| 9,910,999 | B1 | 3/2018 | Yu | |

(Continued)

OTHER PUBLICATIONS

U.S. Appl. No. 14/980,676, filed Dec. 28, 2015, Ray David Whitmer.

(Continued)

*Primary Examiner* — Kambiz Zand
*Assistant Examiner* — Tongoc Tran
(74) *Attorney, Agent, or Firm* — Workman Nydegger (57) ABSTRACT In one example, a method includes defining a token protocol, creating, based on the token protocol, a set of tokens, each of the tokens being associated with data of an encrypted dataset, where the tokens exclude positional information regarding the data with which they are associated, encrypting the tokens, and creating an encrypted search index that includes the encrypted tokens.

20 Claims, 5 Drawing Sheets

(56) References Cited

U.S. PATENT DOCUMENTS

| | | |
|---|---|---|
| 9,977,918 B2 | 5/2018 | Fan |
| 10,073,981 B2 * | 9/2018 | Arasu .................. G06F 21/606 |
| 2009/0327749 A1 * | 12/2009 | Sacson .................... G06F 21/62 |
| | | 713/189 |
| 2010/0306221 A1 | 12/2010 | Lokam |
| 2011/0004607 A1 * | 1/2011 | Lokam ................ G06F 21/6227 |
| | | 707/759 |
| 2013/0046974 A1 * | 2/2013 | Kamara .................... H04L 9/00 |
| | | 713/165 |
| 2013/0300713 A1 | 11/2013 | Gu |
| 2014/0351260 A1 | 11/2014 | Sundaram |
| 2014/0373176 A1 | 12/2014 | Arning |
| 2015/0143112 A1 | 5/2015 | Yavuz |
| 2015/0324592 A1 | 11/2015 | Dutta |
| 2015/0356314 A1 | 12/2015 | Kumar |
| 2015/0363611 A1 * | 12/2015 | Redberg ................ G06F 21/602 |
| | | 713/165 |
| 2016/0125198 A1 * | 5/2016 | Hahn .................. G06F 21/6227 |
| | | 713/165 |
| 2017/0026350 A1 | 1/2017 | Dawoud |
| 2017/0061151 A1 | 3/2017 | Baessier |
| 2017/0091475 A1 | 3/2017 | Fan |
| 2017/0139985 A1 * | 5/2017 | Hahn .................. G06F 21/6227 |
| 2018/0124026 A1 | 5/2018 | Dawoud |

OTHER PUBLICATIONS

U.S. Appl. No. 14/980,676, filed Jul. 13, 2018, Notice of Allowance.

\* cited by examiner

ENCRYPTED SEARCH INDEXES

RELATED APPLICATIONS

This application is a continuation of, and hereby claims priority to, U.S. patent application Ser. No. 14/980,676 entitled ENCRYPTED SEARCH INDEXES, and filed Dec. 28, 2015. All of the aforementioned applications are incorporated herein in their respective entireties by this reference.

FIELD OF THE INVENTION

Embodiments of the present invention generally concern data backup and restoration. More particularly, at least some embodiments of the invention relate to systems, hardware, computer-readable media, and methods directed to the implementation and use of encrypted search indexes.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

Many backups often resided on-premises at the client or user. Because backup and restore operations are generally only performed within the confines of the enterprise, rather than over the wire to and from a cloud storage service for example, these on-premises backups were typically not encrypted.

With the advent of cloud and other remote storage systems however, concerns have arisen about the vulnerability of stored data, and the vulnerability of data as it is transmitted to and from the cloud storage system. Thus, many enterprises that have moved from on-premises storage to cloud storage now require their stored and transmitted data to be encrypted.

In recognition of the threat posed to data security by unauthorized personnel such as hackers, many entities have taken steps to encrypt their data backups. There are a variety of encryption solutions available, some of which are quite robust, and others of which are considerably less so. Some of the less robust approaches to encryption may involve, for example, word level encryption in which a token is generated for each word in a data backup. This approach provides a relatively low degree of protection however because, for a given word, the range of possible decryption solutions is relatively small and, accordingly, it may not take long for an unauthorized person and/or system to exhaust the possibilities and arrive at the solution.

Moreover, once a word is decrypted, it is a relatively simple matter for an unauthorized user and/or system to search for the same token in the data, and then correlate any tokens found with the known word. This process can be easily repeated for each decrypted word, and complete decryption may be attained relatively quickly and easily. Such unauthorized access is made even easier by the inclusion, in some encrypted data, of positional information that indicates where a particular word appears relative to another word, or words.

In light of concerns such as these, more robust approaches to encryption have been developed that may involve block encryption of large chunks of data in which large numbers of words are encrypted together, so as to produce a large mass of encrypted data. This type of encryption provides a high level of security because it produces a large mass of what appears to be random data. Thus, it may be nearly impossible for an unauthorized person and/or system to even search the encrypted data, much less parse out, and then decrypt, individual words from the mass of encrypted data.

Although encryption has proven useful in the context of data security, its use has introduced some difficulties, one of which relates to the ability to search the encrypted data. In particular, some entities would like to be able to search their encrypted data while, at the same time, preserving an effective level of data security. However, typical search indexes are only effective when employed with unencrypted data. Thus, while data encryption can provide a significant measure of security, it also makes searching of the encrypted data relatively difficult. Moreover, it is generally the case that the ability to search data is degraded in tandem with increasing robustness of encryption.

Thus, entities that use cloud storage and/or other remote storage solutions are presented with a dilemma. In particular, a relatively high degree of data security can be obtained, but at the cost of losing the ability to effectively search the encrypted data. On the other hand, it is possible to attain a relatively high degree of effectiveness in searching encrypted data, but only so long as the encryption of that data is relatively weak.

In light of problems such as those noted above, it would be useful to provide systems, methods and devices capable of providing an acceptable level of encryption while also enabling effective searching of the encrypted data. It would also be useful to provide an encryption solution and search index that do not use positional information of the data that is encrypted. As well, it would also be useful to provide a hybrid encryption solution that is neither a word level encryption nor a block encryption. Further, it would be useful to provide an encrypted search index that enables effective searching of encrypted data.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern systems, hardware, computer-readable media, and methods directed to the implementation and use of encrypted search indexes that enable searching of encrypted data. Embodiments of the invention can be employed, for example, in connection with encrypted data residing in a cloud storage environment, but the scope of the invention is not limited to such applications and environments.

Embodiments of the invention can be employed in connection with any type of data. As used herein, the term 'data' is intended to be construed broadly and includes, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

In connection with the examples noted immediately below, as well as the examples disclosed elsewhere herein, it should be noted that the use of words is employed simply as a convenient way to illustrate aspects of embodiments of the invention. However, the scope of the invention is not limited to the use of words nor to any other particular form, group, combination or string of data.

In at least some embodiments, an encryption scheme is employed that provides useful encryption of data, while also enabling effective searching of the encrypted data. One example encryption scheme involves the encryption of a dataset that includes two or more words. The following illustrative example involves a dataset with five words separated by spaces. In this example, the dataset can be expressed as WORD1_WORD2_WORD3_WORD4_WORD5. The encryption process initially produces an encryption of each of the words, that is, a word level encryption which consists of the encrypted tokens WORD1(e), WORD2(e), WORD3(e), WORD4(e) and WORD5(e). The following encrypted tokens could also be produced: WORD1WORD2(e); WORD2WORD3(e); WORD3WORD4(e); WORD4WORD5(e); WORD1WORD3(e); WORD2WORD4(e); and WORD3WORD5(e). Thus, the dataset in this example can be used to generate a total of twelve encrypted tokens.

As is thus apparent, the encrypted index can contain more entries than there are actual words in the dataset. That is, while the original dataset in the example above had only five entries, the search index includes twelve entries associated with that dataset. Moreover, no positional information regarding the words of the dataset is used in these encryption processes and, to provide added data security, the tokens can be stored in random or alphabetical order.

In any event, once the tokens have been created and indexed, the index can then be searched. Continuing with the aforementioned example, initiation of a search for the quoted string 'WORD2_WORD3_WORD4' results in the generation of the encrypted search tokens WORD2(e), WORD3(e), WORD4(e), WORD2WORD3(e), WORD3WORD4(e), and WORD2WORD4(e). These six tokens would then be searched for in the encrypted index. As is evident, the exact search string will not be returned when the index is searched. However, when the six search tokens are compared against the initial set of twelve tokens, it can be seen that all of the six search tokens match a token in that initial set. This high degree of correlation between the search results and the tokens of the dataset suggests that it is quite likely that the searched string appears somewhere in the dataset. These search results can then be provided to the searcher who can check the results as the original dataset is decrypted.

Advantageously then, at least some embodiments of the invention provide for a useful level of security while also enabling the use of search indexes for the encrypted data. As well, encryption may be enhanced by the exclusion of positional data from the tokens and the search index. Further, at least some embodiments of the invention provide for all encryption to take place at the client such that data transmitted to/from, and stored at, a cloud storage platform is always encrypted.

A. Example Operating Environments

In general, embodiments of the invention may include and/or be implemented in an operating environment that includes various clients and/or other devices that generate and/or cause the generation of data that is desired to be backed up. The data can be encrypted prior to transmission and the encrypted data stored at a cloud storage platform in encrypted form. When required for a restoration process for example, the encrypted data can be transmitted, still in an encrypted state, from the cloud storage platform to one or more clients which can then decrypt the data.

Figure 1:
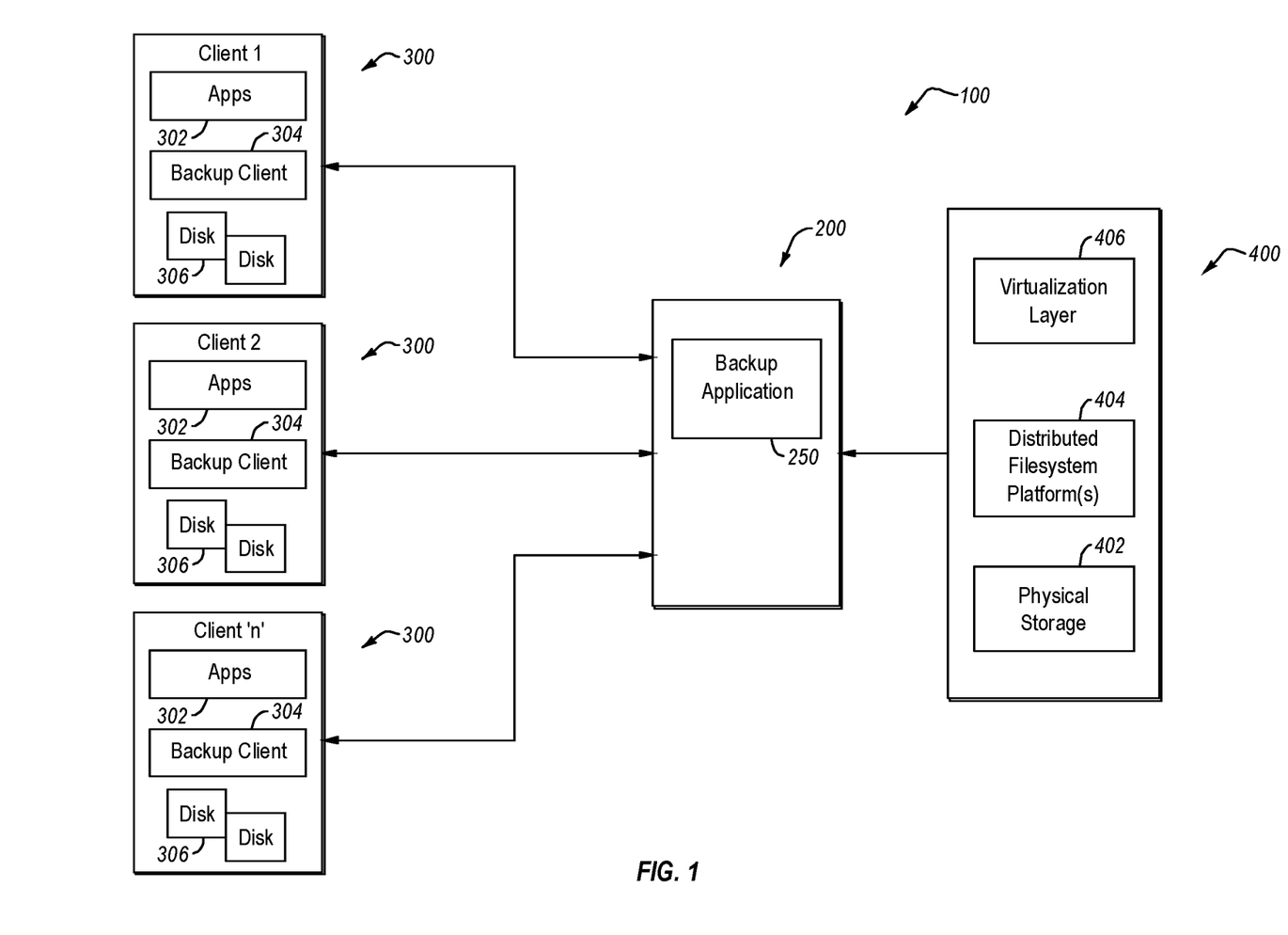
FIG. 1 is directed to aspects of an example operating environment for at least some embodiments.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, the Internet, or any other networked configuration. Moreover, the operating environment 100, or any group of one or more of its elements, may comprise, form an element of, or constitute, a cloud computing environment. The operating environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with one or more nodes, such as one or more clients 300, and a storage node 400 which, in some embodiments at least, is a cloud storage platform. In general, backups of one or more of the clients 300 can be made by cooperation between the backup server 200 and the client 300, and the backups can then be stored by the backup server 200 at the storage node 400. Subsequently, one or more of the stored backups can be restored to one or more of the clients 300 and/or any other target(s). The backups created by the backup server 200 and client(s) 300 may be encrypted by the client 300 or backup server 200 prior to transmission to the storage node 400. The backup server 200, clients 300, storage node 400 and/or target(s) may be physical machines, virtual machines (VM), combinations of physical machines and virtual machines, and/or any other suitable type of device.

One or more of the nodes, such as client 300, with which the backup server 200 communicates can take the form of a server. It is not required that the server be any particular type of server. One or more of the client(s) 300 include any of various applications 302, at least some of which generate data that is desired to be protected. One of the applications 302 may be an application for encrypting/decrypting data that is to be backed up at/restored from the storage node 400. As well, the client(s) 300 can each include a respective instance of a backup client 304 that generally operates in cooperation with the backup application 250 of the backup server 200 to create one or more backups that include data that is resident on storage media 306, such as disks for example, of the client 300.

With particular reference now to the storage node 400, such a storage node can include, or at least access, physical storage 402 in the form of one or more physical storage nodes. One example of such a storage node in connection with which at least some embodiments could be employed is the Amazon Simple Storage Service (Amazon S3) platform, although any other cloud storage platform could be employed. Other example platforms include OpenStack Swift, EMC Corp. Atmos, Centera CAS, and Hadoop HDFS. Further, an example of a physical storage node is the Infinity physical commodity box produced by EMC Corp., although any other physical storage node(s) could alternatively be employed.

The physical storage 402 may comprise an element of a distributed filesystem platform 404, such as an lsilon, EMC Corp. Elastic Cloud Storage (ECS), or other storage cluster, although no particular form of implementation of the physical storage 402, or its constituent components, is required.

The lsilon cluster, for example, is configured to provide high-volume storage, backup and archiving of unstructured data. In brief, the Isilon cluster can provide a cluster-based storage array based on industry standard hardware, and is scalable to 50 petabytes in a single filesystem. In some embodiments at least, the Isilon clustered storage system is composed of three or more nodes. Each node can be a self-contained, rack-mountable device that contains industry standard hardware, including disk drives, CPU, memory and network interfaces, and is integrated with an operating system software which unifies a cluster of nodes into a single shared resource. Depending upon the configuration, the Isilon hardware platform can include a variety of different nodes, such as S-Series nodes (for high-performance, process-intensive, high-transaction applications), the X-Series nodes (for high-throughput and high-concurrency application needs), the NL-Series nearline storage nodes (for archiving, disaster recovery and disk-to-disk backup needs); and, the HD-Series nodes (for large-scale, high-density deep archive storage needs, as well as disaster recovery).

With continued reference to FIG. 1, the storage node 400 may include a virtualization layer 406 that virtualizes, or abstracts, and pools the physical storage 402 for one or more of the clients 300 and/or the backup server 200. Such abstraction and pooling is useful in environments where the physical storage 402 may comprise a variety of different storage resources, each with its own application program interface (API) and operating requirements.

In some embodiments, the virtualization layer 406 may take the form of, or include, the EMC Corp. ViPR Controller or the EMC OnRack hardware abstraction layer (HAL), although neither of these implementations is required. In other embodiments, the virtualization layer 406. Among other things, the virtualization layer 406 may enable automated provisioning of storage services, while doing so in a way that is transparent to the client(s) 300 and/or the backup server 200. For example, the client(s) 300 and/or the backup server 200 may be unaware of the underlying hardware and software that is providing storage for the client 300 applications 302. The provisioning of storage for client 300(s) can be performed automatically by the virtualization layer 406 based on predefined policies.

B. Example Host Configuration

Figure 2:
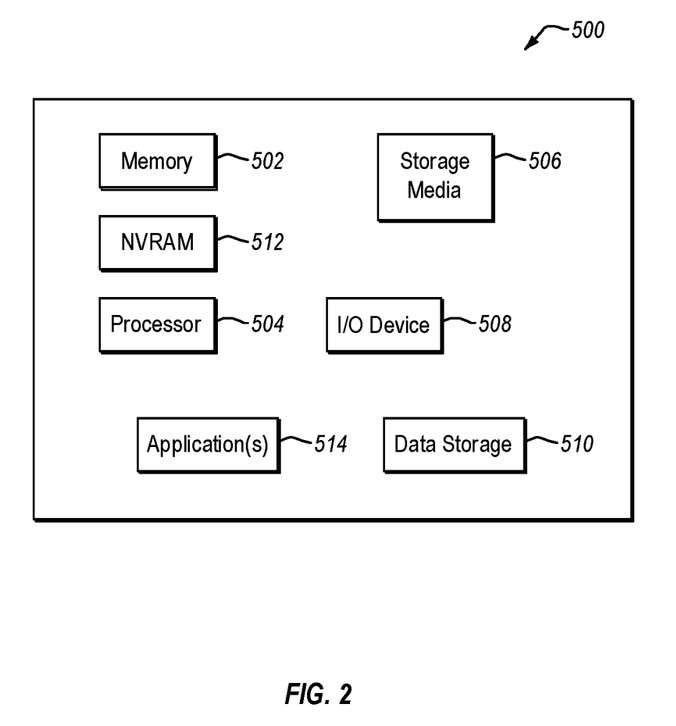
FIG. 2 is directed to aspects of an example computing system.

With reference briefly to FIG. 2, one or more of the backup server 200, client 300 and storage node 400 can consist of, comprise, or take the form of, one or more physical computing devices, one example of which is denoted at 500 in FIG. 2. In the example of FIG. 2, the computing device 500 includes a memory 502, one or more hardware processors 504, non-transitory storage media 506, I/O device 508, data storage 510, and NVRAM 512. As well, one or more applications 514 are provided that comprise executable instructions. Such executable instructions can take the form, for example, of any one or more of a backup application, a backup client, a deduplication application, one or more encryption/decryption applications, a distributed filesystem application, and applications for storage asset provisioning.

C. Example Approaches to Encryption

Figure 3A:
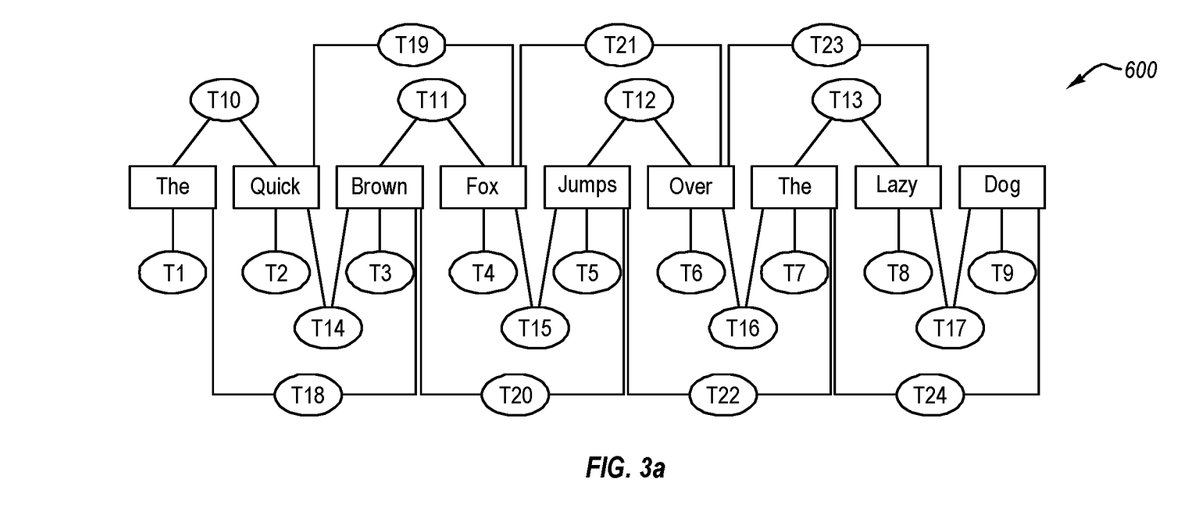
FIGS. 3a and 3b are directed to example tokenization schemes.
Figure 3B:
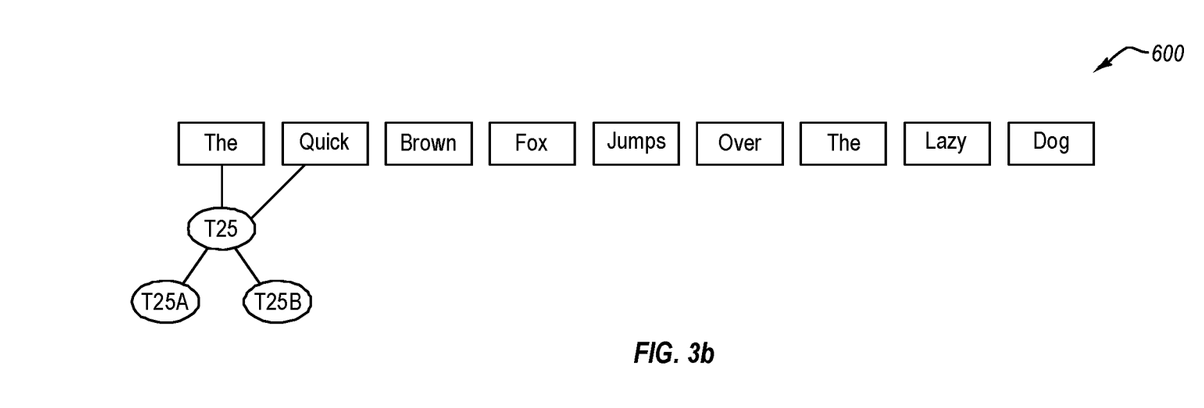

With reference now to FIGS. 3a and 3b, details are provided concerning aspects of some example encryption schemes. It should be understood that the disclosure of these Figures is presented only by way of example, and variations and modifications of those examples will be apparent to a person of ordinary skill in the art having the benefit of the present disclosure and, as such, those variations and modifications are considered to be within the scope of this disclosure.

Turning first to FIG. 3a, various concepts are illustrated using an example that includes an English language sentence as an example of a dataset. It should be understood however that the scope of the invention is not so limited, and a dataset as contemplated by this disclosure can include multiple data portions of any type, size or order. Moreover, as used herein, the term 'word' is intended to be broad and general in nature and is not limited to linguistic words such as are employed in the aforementioned example. For example, 'word' embraces, but is not limited to, a unit of data used by a processor. Thus, a word can be a piece of data of fixed size handled as a unit by the instruction set or the hardware of the processor. Such a word may have a number of characteristics, including a word size, word width, and/or word length.

With particular reference now to FIG. 3a, an example dataset 600 includes nine (9) words separated by spaces, namely, the words "THE QUICK BROWN FOX JUMPS OVER THE LAZY DOG." In general, this dataset 600 can be encrypted in a variety of ways that exclude the use of positional information, that is, the position of a word of the dataset relative to one or more other words of the dataset. In more detail, a variety of tokens can be defined, based on the words of the dataset, that relate to the dataset but which do not include positioning information concerning the words of the dataset. As such, these tokens, whether encrypted or unencrypted, may be referred to herein as functional codes.

In general, the number of tokens defined in any particular case is not limited, and the number of tokens defined may be determined in part by the size of the dataset. Thus, a relatively large dataset may enable definition of relatively more tokens than a relatively small dataset. As well, use of a relatively larger number of tokens for a dataset can provide relatively better results when the dataset is searched, but also results in relatively larger search indexes. As a practical matter, a balance can be struck between the quality of results desired and the acceptable size of the search index.

In more detail, various sets of tokens can be defined that correspond to the dataset 600. The rule or rules used to define a token, or set of tokens, may be referred to herein as a token protocol. For example, a token T1 . . . T9 can be defined for each of the nine words in the dataset 600. In the present example, another set of tokens T10 . . . T13 can be defined, for example, by pairing words of the dataset. Thus, the eight tokens THEQUICK, QUICKBROWN, BROWNFOX, FOXJUMPS, JUMPSOVER, OVERTHE, THELAZY, and LAZYDOG can be defined. As should be apparent, each of these tokens T10 . . . T17 can be a combination of two or more tokens of the dataset 600. For example, the token T10 (THEQUICK) is a combination of tokens T1 (THE) and T2 (QUICK). In this set, the token DOG has already been defined as T9, but could additionally or alternatively be combined with one of the tokens T10 . . . T13. Still another set of tokens T18 . . . T24 that can additionally, or alternatively, be defined include THEBROWN, QUICKFOX, BROWNJUMPS, FOXOVER, JUMPSTHE, OVERLAZY, and THEDOG. The set of tokens T18 . . . T24 is generated by skipping intervening words of the dataset, and serves as a next layer of encryption that joins content that is slightly further apart, thus giving a relatively stronger effect for quoted material where the order of the words is important still, even though the words that make up the tokens are not adjacent words, without requiring the functional codes themselves to appear in a particular order.

As will be apparent from the aforementioned example dataset, the number of tokens defined in this example is twenty four (24) although the dataset itself consists of only nine (9) words. Thus, a search index for this dataset contains almost three times as many entries as the dataset contains words. However, there is no requirement that there be any particular correspondence, in terms of numbers, between the words in the dataset and the number of tokens corresponding to that dataset. At least some of the various tokens generated in the examples disclosed herein may be referred to as having a 'fuzzy' character or property, inasmuch as those tokens do not exactly correspond to words of the dataset, but may be similar to one or more words of the dataset. For example, the dataset noted above does not include the combination 'LAZYDOG,' but the dataset does include the words LAZY and DOG.

It should also be apparent from the aforementioned example dataset and associated tokens that none of the tokens exposes information regarding the position of any given word with respect to any other word(s) of the dataset. The tokens are simply words or combinations of words that internally capture positional context and allow the positional content to be matched without exposing the positional content or requiring positional matching of the tokens themselves by the exposed search index of encrypted tokens.

As well, it should be noted that these combinations of adjacent or nearby words not only encode the position of words hidden inside the tokens, but also encourage fuzzy matching where words may have been split or joined differently between the query and the content. For example, the content being indexed may have recorded the words "inprocess", and the query may be "inprocess," which would not match at all using only one token per word. However, due to generation of tokens combining adjacent words, matches are detected in this case, all without decrypting the tokens.

Thus, the tokens are created so that they exclude any positional information and, as such, provide an enhanced degree of security. In particular, even if an unauthorized user were to gain access to the words in their unencrypted form, there is no positional information available to guide that unauthorized user as to the correct order of the words. Thus, it may become increasingly difficult for an unauthorized user to decrypt the dataset as the dataset increases in size, and this can be true even if the dataset is encrypted on an individual word basis, or small word group basis, as in the foregoing example.

As noted in the example of FIG. 3a, tokens can be combined in some embodiments to define still other tokens. Turning now to the example of FIG. 3b, tokens can be split in various embodiments of the invention to define still other tokens. For example, the first two words of the dataset 600 can be combined to define a token THEQUICK, denoted as T25. The token T25 can then be split, in any of a variety of ways, to form two tokens derived from the token T25, namely, T25A and T25B. For example, in one embodiment, T25 can be split to create two tokens, each of which includes every other letter of THEQUICK, thus, T25A is TEUC while T25B is HQIK. Put another way, one token includes the odd numbered letters and the other token includes the even numbered letters. One useful aspect of this approach to tokenization is that it is able to provide some compensation for misspellings that may exist in the dataset. In particular, if one letter, or just a few letters, are incorrect, such as in T25A for example, a token match for T25B may still be obtained and provide useful insight as to whether or not the associated words appear in the dataset. Additional tokens that can be generated using one or both of the words THE and QUICK include THE, QUICK, QUICKBROWN, THEBROWN, QUICKFOX. Each of these could be split in the manner noted above, or in any other manner.

In this example then, the search index would include a total of six entries relating to the two dataset words THE and QUICK. Of course, a token can be split into more than two tokens, and the foregoing is thus presented only by way of example. Consistent with this point, other token protocols can be used to split the token T25. For example, T25 could be split into three tokens, each including every third letter of T25. Thus, any search query that would have matched the original T25 token will match all three tokens with similar reliability to the original token. But if the search word has been misspelled, a fuzzy match of two tokens of the three is still possible, and better than not matching a token at all. This sort of decomposition thus can cause close matches to not completely fail in their matches but to succeed less strongly. This token decomposition may be combined with the previously-described process of joining adjacent or nearby words into a token.

With continued reference to the examples of FIGS. 3a and 3b, it will be appreciated that not only can tokens be combined, or split, to define one or more other tokens, but those examples also suggest and enable a layered approach to encryption that involves multiple token generation and encryption processes. Some examples of such a layered approach are discussed below.

In particular, and with reference first to FIG. 3a, tokens T1 and T2 can first be defined, and then combined to define the token T10. Thus, there are two token definition processes. Correspondingly, two encryption processes can be performed as well. For example, T1 and T2 can each be encrypted individually and then combined. The combination of T1 and T2 can then be encrypted as well. In similar fashion, and with reference to the example of FIG. 3b, token T25 can first be defined, and then split to define tokens T25A and T25B. Thus, there are two token definition processes. Correspondingly, two encryption processes can be performed as well. For example, T25 can first be encrypted, and then split into T25A and T25B, which can also then be encrypted.

As will be apparent from the disclosure herein, tokens can generally be combined and/or split in any given embodiment, and the scope of the invention is not limited to the illustrative examples noted herein. As such, a particular embodiment may reflect the use of only one, or more than one, token protocol, and the scope of the invention is not limited to any number or type of token protocols. In fact, any token protocol that produces tokens that exclude positional information concerning the data to which they relate is considered to be within the scope of this disclosure.

D. Example Encrypted Search Index

Figure 4:
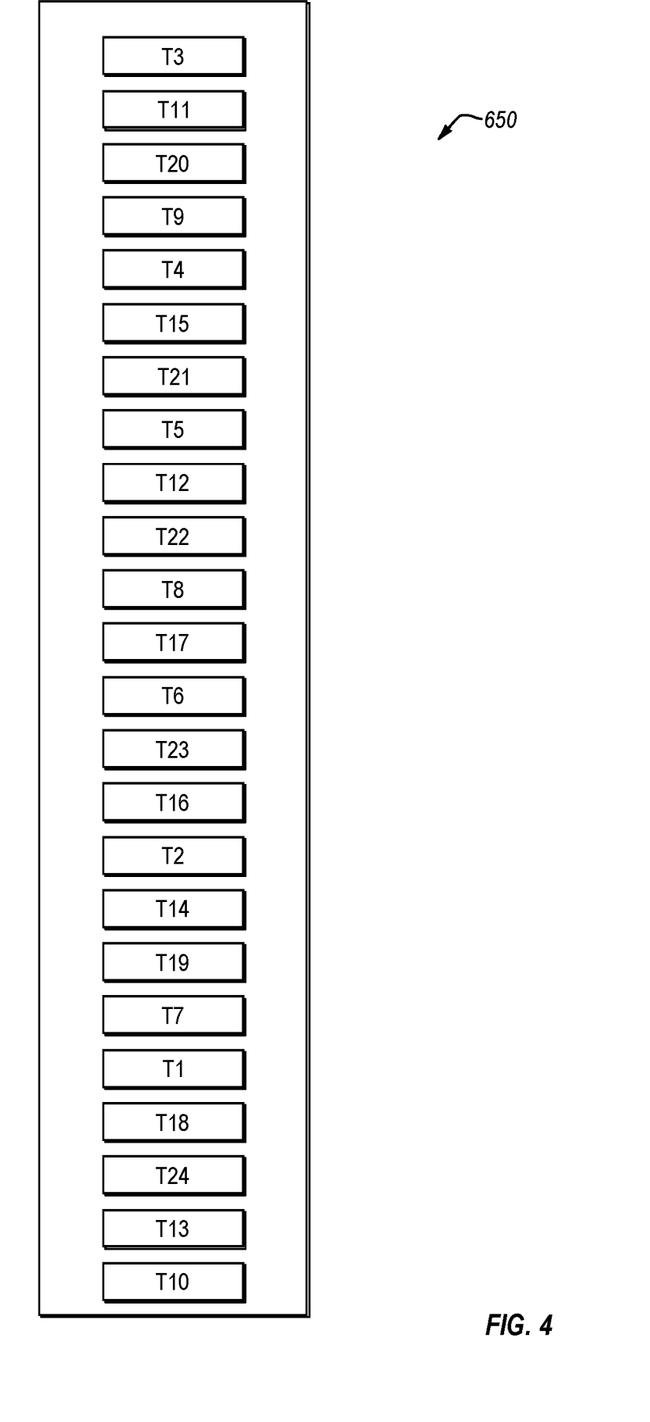
FIG. 4 is directed to an example encrypted search index.

Turning now to FIG. 4, and with continued attention to the illustrative example of FIG. 3a, further details are provided concerning encrypted search indexes, one example of which is denoted at 650. In general, the encrypted search index 650 can be created/revised at a client, such as client 300, and then transmitted to the same location as the data to which the encrypted search index 650 pertains. Thus, the encrypted search index 650 can be stored in association with the related data at a storage node 400, such as a cloud storage node. The encrypted search index 650 can be transmitted to the storage node by the client 300 or backup server 200, and can be transmitted together with the backup data, or transmitted separately from the backup data. As suggested by the name, the information in the encrypted search index is in encrypted form.

With particular reference now to FIG. 4, the example encrypted search index 650, which includes each of the seventeen tokens indicated in FIG. 3a, lists those tokens in alphabetical order, for example. The tokens themselves are encrypted, and the decryption information for the listed tokens, such as a key for example, is held at the client or clients from which the associated dataset(s) originated. In at least some embodiments, no decryption information or decryption mechanisms are stored at the storage node with the data and the encrypted search index 650. In some embodiments, the encrypted search index includes only token-specific identifiers, rather than listing the tokens themselves.

Because the tokens, or their identifiers, are listed in the encrypted search index 650 in alphabetical order, it would be difficult for an unauthorized user to draw any useful inferences concerning the order of the associated data in the dataset to which the encrypted search index 650 pertains. That is, the use of alphabetical order to store the tokens provides no positional information concerning the data to which those tokens relate. The scope of the invention is not limited to alphabetical order however. For example, in other embodiments, the encrypted tokens can be stored in random order in the encrypted search index 650. More generally, the encrypted tokens can be stored in the encrypted search index 650 in any way that does not reveal or suggest positional information regarding the data to which those tokens relate. Thus, the encrypted search index is free of any positional information regarding that data.

E. Example Processes

Figure 5:
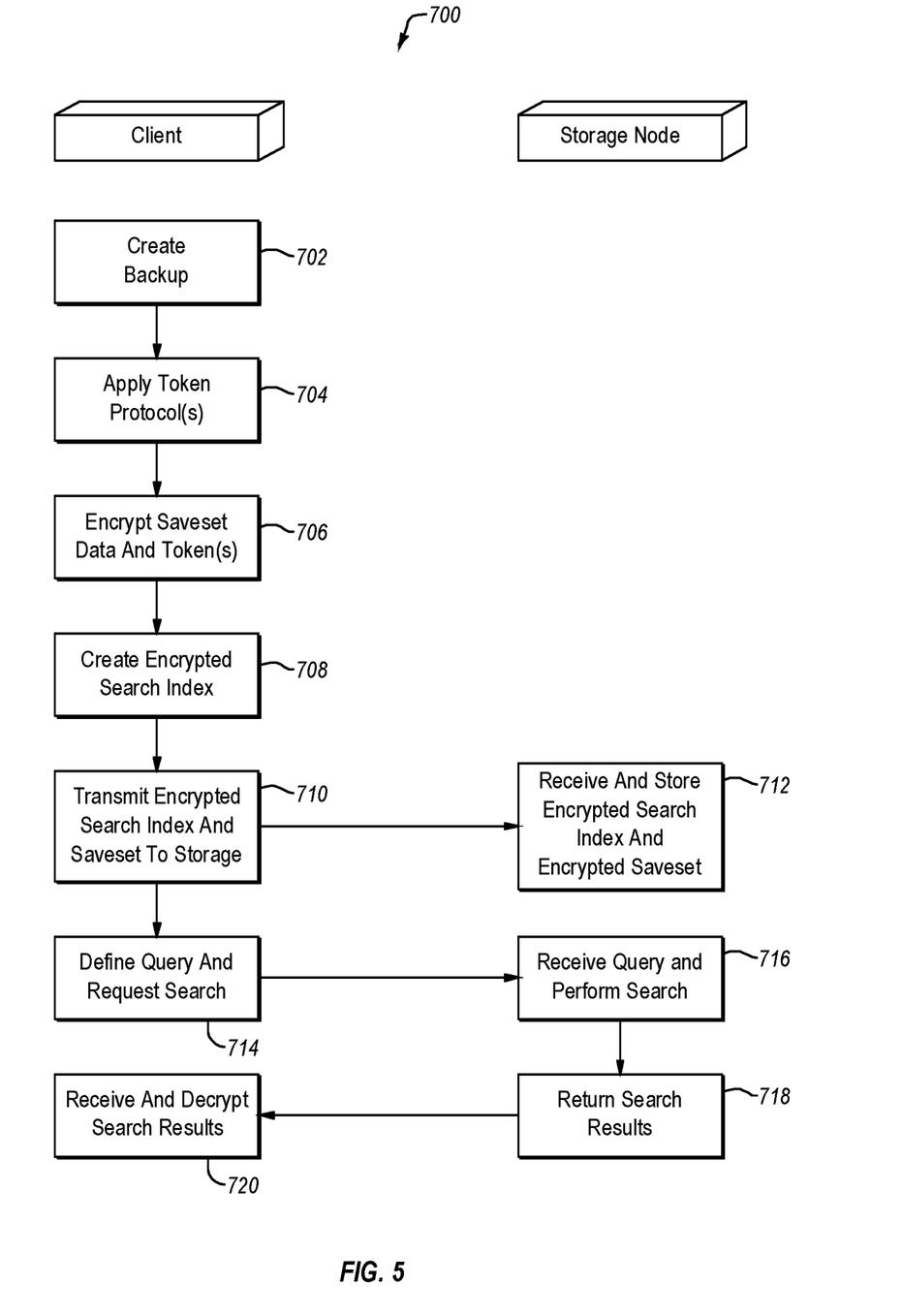
FIG. 5 is directed to example methods for searching encrypted data.

With attention now to FIG. 5, details are provided, concerning some example processes implemented by embodiments of the invention. Examples of such processes are collectively denoted generally at 700 in FIG. 5.

Initially, a backup is created 702 of data residing at, for example, a client 300. The backup can be created by cooperation of a backup application at a backup server and a backup client at the client 300 whose data is the subject of the backup. The backup can consist of, or comprise, deduplicated data, although neither is required. The data identified in the backup may be referred to herein as a saveset.

After the saveset has been created 702, one or more token protocols can be applied 704 to the saveset, or other dataset, to create a set of tokens corresponding to the data in the saveset. The token protocols can be defined on-the-fly, such as by an administrator. In at least some embodiments, one or more token protocols can be selected from a library of token protocols. The token protocols can also be configured to expire after a period of time so as to enhance security by requiring users to employ updated/different token protocols. In some embodiments, the token protocols can be generated automatically while, in other embodiments, the token protocols can be generated manually. The library can reside at the client, and/or elsewhere.

As well, in at least some embodiments, application of the token protocols takes place at the client whose data is included in the saveset. In any case, the tokens and saveset data can then be encrypted 706. It should be noted that any dataset(s) can be selected by a user for tokenization. In some embodiments, the user may be presented with a list of savesets from which to select.

In some embodiments, the data in the saveset is normalized before any encryption takes place. In general, normalization can involve refining the data of the saveset in such a way as to avoid, or at least limit, the return of spurious results when the data is searched. By way of illustration, normalization can involve capitalizing all the letters in a saveset, or converting all punctuation in a saveset to spaces.

In further embodiments, it is not required that the tokens be decrypted. That is, the tokens need not be encrypted with an encryption that can be decrypted. For example, the tokens can be encrypted using a key known only to the client. The original content, rather than the corresponding tokens, can be retrieved and decrypted, thus enabling the user or client to eliminate any false positives after most of the non-matches have already been filtered out by the comparison of the tokens identified in the query with the tokens of the search index.

Once the data has been encrypted 706, the encrypted tokens are used to create 708 an encrypted search index. In general, the encrypted search index can be stored together, or at least in association with, the saveset to which the encrypted search index pertains. Thus, the encrypted search index can be transmitted 710 with the encrypted saveset to a storage node, such as a cloud storage node for example. This approach can provide for a relatively high level of security since communications, including the saveset and encrypted search index, between the client and/or backup server and the storage node are always in encrypted form. Moreover, because decryption information is not stored at the storage node, it is unlikely, if not impossible, for an unauthorized person at the storage node to gain access to the stored encrypted data and encrypted search index. Thus, tracing of a data breach will resolve to an entity, or entities, other than the storage node.

Next, the encrypted search index and the encrypted saveset are received 712 at the storage node. At the storage node, the encrypted search index and the encrypted saveset are stored in association with each other.

Once the encrypted saveset and the encrypted search index are stored 712, a user can then define 714 a query pertaining to the encrypted saveset and request that the defined query be performed. Definition of the query can be implemented, for example, at a client or backup server by an administrator or other use. In order for the query to be defined, the user must know or obtain the encrypted versions of the search terms or strings so that those encrypted versions can be specified in the query. These encrypted versions are typically stored at and/or accessible by the client.

In at least some embodiments, the query is defined 714 by way of a user interface, such as a graphical user interface (GUI) and/or command line interface (CLI), for example. In general, the query can take a variety of forms. For example, the query can be structured to search for a particular string, or strings, of words from the saveset. In this case, the search criteria for the query can comprise, or consist of, one or more paired word tokens such as are discussed above. Additionally, or alternatively, the query may be directed to one or more terms of interest, where the terms are in no particular order. In this case, the search criteria may comprise, or consist of, one or more single word tokens. More generally however, the scope of the invention is not limited to any particular form or structure of query, nor to any particular search criterion or criteria.

The query is then received 716 by the storage node, and the specified search is performed. The search can be performed by any of a variety of search engines. In some embodiments, the search engines can be implemented as a search server, although that is not necessarily required. The search engine may reside at the storage node. Example search engines that can be employed include the open-source Elastic Search search engine, and the open-source Solr search engine, although neither of these is required and any other suitable search engine(s) could alternatively be used.

With particular reference now to the search, the dataset identified by the client is searched at the storage node to determine if one or more of the tokens in the query are also present in the dataset. None, one, some, or all of the tokens in the query may be found to match tokens of the search index that corresponds to the dataset. In any event, the search results are returned 718 to the requesting entity, such as a client, which can then receive and decrypt 720 the results.

Because positional information is not included in the search criteria or the search index, the exact search string will not be returned in the results when the encrypted search index is searched. However, the probability that the searched string is present in the dataset generally increases with the number of matches that are found between the tokens of the search criteria and the tokens of the search index. Thus, the search results can be provided to the user who can check the results as the original dataset is decrypted. The user can then make a final determination as to whether the information in the query is present or not in the dataset.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method, comprising:
defining a token protocol;
creating, based on the token protocol, a set of tokens, each of the tokens being associated with data of an encrypted dataset, wherein the tokens exclude positional information regarding the data with which they are associated;

encrypting the tokens; and creating an encrypted search index that includes the encrypted tokens.

2. The method as recited in claim 1, wherein the number of tokens is greater than the number of words in the encrypted dataset.

3. The method as recited in claim 1, wherein one of the tokens is similar, but not identical, to one or more words of the encrypted dataset.

4. The method as recited in claim 1, wherein one of the tokens is generated by combining two or more words of the encrypted dataset.

5. The method as recited in claim 1, wherein one of the tokens is generated by combining two words of the encrypted dataset, and wherein the two words are separated by one or more other words of the encrypted dataset.

6. The method as recited in claim 1, further comprising creating one or more additional tokens by performing an additional token creation process.

7. The method as recited in claim 6, wherein one of the additional tokens is created by combining two or more tokens of the set of tokens, and the method further comprises encrypting the additional token that was created by combining two or more of the other tokens.

8. The method as recited in claim 6, wherein two or more of the additional tokens are created by splitting one of the tokens of the set of tokens, and the method further comprises encrypting the two or more additional tokens that were created by splitting the one token.

9. The method as recited in claim 6, wherein the one or more additional tokens are created based on another token protocol.

10. The method as recited in claim 1, wherein one of the tokens is configured to partly compensate for a misspelling in the encrypted dataset.

11. A non-transitory storage medium having stored therein computer-executable instructions which, when executed by one or more hardware processors, perform the following operations:

defining a token protocol;

creating, based on the token protocol, a set of tokens, each of the tokens being associated with data of an encrypted dataset, wherein the tokens exclude positional information regarding the data with which they are associated;

encrypting the tokens; and creating an encrypted search index that includes the encrypted tokens.

12. The non-transitory storage medium as recited in claim 11, wherein the number of tokens is greater than the number of words in the encrypted dataset.

13. The non-transitory storage medium as recited in claim 11, wherein one of the tokens is similar, but not identical, to one or more words of the encrypted dataset.

14. The non-transitory storage medium as recited in claim 11, wherein one of the tokens is generated by combining two or more words of the encrypted dataset.

15. The non-transitory storage medium as recited in claim 11, wherein one of the tokens is generated by combining two words of the encrypted dataset, and wherein the two words are separated by one or more other words of the encrypted dataset.

16. The non-transitory storage medium as recited in claim 11, wherein the operations further comprise creating one or more additional tokens by performing an additional token creation process.

17. The non-transitory storage medium as recited in claim 16, wherein one of the additional tokens is created by combining two or more tokens of the set of tokens, and the method further comprises encrypting the additional token that was created by combining two or more of the other tokens.

18. The non-transitory storage medium as recited in claim 16, wherein two or more of the additional tokens are created by splitting one of the tokens of the set of tokens, and the method further comprises encrypting the two or more additional tokens that were created by splitting the one token.

19. The non-transitory storage medium as recited in claim 16, wherein the one or more additional tokens are created based on another token protocol.

20. The non-transitory storage medium as recited in claim 11, wherein one of the tokens is configured to partly compensate for a misspelling in the encrypted dataset.

* * * * *